(12) United States Patent  
Owhadi

(10) Patent No.: US 6,963,998 B2  
(45) Date of Patent: Nov. 8, 2005

(54) ELECTRONIC APPARATUS HAVING IMPROVED DIAGNOSTIC INTERFACE

(75) Inventor: Eric Owhadi, Sassenage (FR)

(73) Assignee: Hewlett-Packard Development Company, L.P., Houston, TX (US)

(*) Notice: Subject to any disclaimer, the term of this patent is extended or adjusted under 35 U.S.C. 154(b) by 55 days.

(21) Appl. No.: 10/659,851

(22) Filed: Sep. 10, 2003

(65) Prior Publication Data

US 2004/0078609 A1 Apr. 22, 2004

Related U.S. Application Data

(62) Division of application No. 09/511,342, filed on Feb. 23, 2000, now Pat. No. 6,662,316.

(30) Foreign Application Priority Data

Nov. 5, 1999 (EP) .................................. 99410152

(51) Int. Cl.[7] ............................................. G06F 11/00
(52) U.S. Cl. ......................... 714/46; 714/14; 714/25; 714/27
(58) Field of Search ....................... 714/46, 14, 25, 714/27; 713/300, 320; 379/93.31, 28, 73

(56) References Cited

U.S. PATENT DOCUMENTS

| 5,103,463 | A | 4/1992 | Schoeneberg | 329/315 |
| 5,148,478 | A | 9/1992 | Saltwick et al. | 380/253 |
| 5,367,667 | A | 11/1994 | Wahlquist et al. | 714/32 |
| 5,481,596 | A | 1/1996 | Comerford | 379/67.1 |
| 5,678,002 | A | 10/1997 | Fawcett et al. | 345/709 |
| 5,854,828 | A | 12/1998 | Kocis et al. | 379/93.31 |
| 6,269,364 | B1 * | 7/2001 | Kennedy et al. | 707/5 |
| 6,279,125 | B1 * | 8/2001 | Klein | 714/38 |
| 6,662,316 | B1 | 12/2003 | Owhadi | 714/46 |

FOREIGN PATENT DOCUMENTS

DE 196 39 644 A1 4/1998

OTHER PUBLICATIONS

"HP Maxlife: for the Highest Productivity and Reliability," *Hewlett-Packard Company*, pp. 1-5 (1998).

* cited by examiner

*Primary Examiner*—Robert Beausoliel  
*Assistant Examiner*—Emerson Puente

(57) ABSTRACT

Electronic apparatus, such as a personal computer, is described comprising main operative functionality and a power provisioning system for powering the apparatus from an external power source, the power provisioning system comprising:—a main power supply output for energizing the main operative functionality of the apparatus when said power provisioning system is connected to said external power source, and a standby power source for energizing a subset of the components of the apparatus when said main power supply output is not energized, the apparatus further comprising a self contained subsystem including a memory for storing at least one parameter reflecting an internal state of the apparatus, said self contained subsystem being powered by said standby power source and including an encoder for encoding the parameters in an output signal and a transducer for generating a wireless transmission from the output signal, which transmission can be detected in the vicinity of the apparatus, so as to enable the parameter to be received and decoded.

17 Claims, 5 Drawing Sheets

ELECTRONIC APPARATUS HAVING IMPROVED DIAGNOSTIC INTERFACE

RELATED APPLICATIONS

This patent application is a divisional application of U.S. Ser. No. 09/511,342, filed on Feb. 23, 2000, now U.S. Pat. No. 6,662,316.

FIELD OF THE INVENTION

The present invention relates to a personal computer, or other similar electronic apparatus, having an improved diagnostic interface.

BACKGROUND OF THE INVENTION

Personal computers are being used in an increasing number of applications. Whilst improvements are continually being made in the user interfaces of personal computers in order to make them usable by a wider cross section of the population, personal computer systems themselves have also greatly increased in their internal complexity so that today most users are unfamiliar with the internal design and configuration of the computers that they use. In consequence, when a computer fails to operate in the manner expected, the user is often unable to determine the source of the problem or how to resolve it.

Various means are provided to enable the user to try to resolve problems they encounter, for instance diagnostic programs, helpfiles and manuals may be supplied by the computer manufacturer. In addition, current PCs are typically equipped with some form of internal diagnostics, the purpose of which is to detect and isolate component faults within the PC architecture.

Diagnostic code can be embedded in solid state, non-volatile memory within the computer. Thus, read-only memory ("ROM"), for instance, has been employed to store diagnostic code as firmware. One type of embedded diagnostics is power-on self-test ("POST") diagnostics, generally stored in basic input-output system ("BIOS") ROM in PCs. POST is a series of tests that the computer performs on its components each time the computer is turned on. POST begins by reading system configuration information that has either been hard-wired or stored in non-volatile memory. It then checks random access memory ("RAM") by writing to and reading from the RAM to ensure proper operation. POST next examines the disk drives to confirm that they match the system configuration information. Lastly, POST initiates the loading of the operating system, "booting" the computer. Failure during execution of POST indicates presence of a fault within the computer. However, POST does not always provide a clear indication of the specific nature of the fault. Instead, the user must run diagnostic software to further isolate the fault.

Some high end personal computer systems, in particular the Hewlett-Packard Kayak range of PC workstations having the Maxilife features, include an integrated diagnostic microprocessor that is linked to its own display and keypad. The display allows diagnostic messages to be displayed to the user. The integrated microprocessor is powered through the standby power supply of the PC, which delivers power whenever the power cord is connected to a grounded power outlet. However, the inclusion of a separate microprocessor, together with its own user interface, adds a significant cost to the computer as a whole.

Moreover, much of the information contained within the diagnostic programs and manuals is often beyond the understanding of the average user and therefore when faced with a problem, the user may need to or may prefer to call the computer manufacturer's customer service line or help desk in order to obtain technical help.

This generally entails making a telephone call and speaking to a help desk representative who will attempt to determine the nature of the problem based on information provided by the user.

This process is often slow and unsatisfactory. The amount of time required for the user to accurately describe the problem to the help desk representative is often considerable. It is also frequently plagued by inaccurate instructions being conveyed to the user over the phone.

For some complex problems, the help desk representative may need to collect some information as to the system configuration. It is not possible to dictate a full log file over the phone, so often the user is asked to transmit these data over email or fax and to call back later. On the second call it is difficult to establish a link between the call and the email or fax received especially when it is necessary to transfer the call through an automatic routing system.

To compound the communication difficulties described above, diagnostic routines are often invoked when components in the computer are not completely functional and so the diagnostics may not execute or interact properly with the computer or with the user.

Various means have been used and proposed to try to speed up or automate this remote diagnostic process.

For instance, U.S. Pat. No. 5,367,667 proposes a method for performing remote diagnostic tests on a personal computer system in which a user calls the customer service help desk. Based on the user's explanation of the problem, a representative builds a file including diagnostic tests. The help desk representative then instructs the user, upon completion of the telephone call, to insert a diagnostic disk, supplied to the user upon purchase of the computer, into the computer and initiate a program which places the user computer's modem in an auto answer mode.

An application dials the user's modem number, which is in the case file, and establishes communications with the user's system to download programs to the user's computer. These programs are then executed and the computer transmits the results back to the service center for the problem to be diagnosed. The representative then calls the user, discusses the test results and makes specific recommendations to address the user's problem.

U.S. Pat. No. 5,854,828 proposes a telephonic customer support utility for providing diagnostic support of a customer computer including encoding an operational status of a customer's computer to produce audible tones on a speaker corresponding to the encoded status for transmission on a standard telephone line via a standard telephone of the encoded operational status to a remote support computer, the remote support computer having a receiver electrically connected to receive the tones transmitted on the telephone line The received tones are decoded by a decoder of the remote support computer to determine the operational status of the customer's computer, which status is displayed on a display of the remote support computer for analysis by a customer support technicians.

However, this system requires the computer to boot correctly and be substantially fully operational before the audible tones can be generated.

Whilst these known systems no doubt ease matters in some ways, a system and method is still needed for allowing remote diagnosis of PCs, even those suffering non-bootable faults, by a remote technician, preferably in a single telephone call.

Since personal computers are relatively low cost items, such a diagnostic system should require as few PC modifications or additions as possible in accomplishing the above, so as to minimise cost and parts count.

This invention is directed to improving the diagnostic interface of, for instance, a personal computer to meet the above needs.

SUMMARY OF THE INVENTION

In brief, this is achieved by electronic apparatus comprising: main operative functionality and a power provisioning system for powering the apparatus from an external power source, the power provisioning system comprising: a main power supply output for energising the main operative functionality of the apparatus when said power provisioning system is connected to said external power source, and a standby power source for energising a subset of the components of the apparatus when said main power supply output is not energised. The apparatus is provided with a self contained subsystem including a memory for storing at least one parameter reflecting an internal state of the apparatus, said self contained subsystem being powered by said standby power source and including an encoder for encoding the parameters in an output signal and a transducer for generating a wireless transmission from the output signal, which transmission can be detected in the vicinity of the apparatus, so as to enable the parameter to be received and decoded The parameter can be encoded within the transmission in a form that does not allow a human to understand the parameter directly from the transmission.

The apparatus is thus provided with an i/o interface that can operate independently of all the other components of the apparatus. In consequence, this i/o interface can be used, in the event of a fault, to output parameters, such as a serial number.

Whilst some complex parameters such as the serial number need to be automatically decoded some parameters, for instance a code enabling a failing unit of the computer to be identified, can be encoded in the transmission in a form that is understandable to a human. In this ways these parameters can be identified, even if no automatic decoder is available.

The invention finds particular application in a personal computer or other similar information appliance, the main operative functionality including in that case a processor and data storage means interconnected by a bus system.

In at least a preferred embodiment, the transducer is a speaker and the wireless transmissions are sounds including in-band encoded signals, suitably using frequency shift keying and including an embedded synchronisation pattern. In apparatus such as a personal computer, that includes an audio subsystem, the speaker normally used for generating sounds for human perception can be used to generate the transmissions. Although the use of sound for the transmissions provides certain advantages to be described in more detail below, the use of other kinds of wireless transmission such as infra-red radiation or radio waves is not excluded.

If sound is used for the transmissions, the sounds can be transmitted over the telephone network in a manner similar to that proposed in U.S. Pat. No 5,854,828 and the decoding of the transmission can take place remotely from the user. The invention therefore enables the provision of an arrangement for providing remote support services to a user of the above described apparatus. The arrangement comprises: a telephone call handling system that provides at least one telephone number that the user can call to get advice from a human support agent; a decoder within the call handling system for decoding sounds generated by the computer and transmitted within a telephone call made by the user so as to enable the computer to transmit the parameter to the call handling system for processing without requiring the user or any support agent to directly understand the parameter from the transmission.

The call handling system can be arranged to generate a database query from the parameter for retrieving diagnostic data for the computer for presentation to a support agent.

In a particularly preferred arrangement, the database query is transmitted over the internet to a database maintained separately from the call handling system. The database can be, for instance, maintained by or on behalf of the manufacturer of the computer and include all machines sold by that manufacturer. The call handling system can be maintained by a third party that is granted access to the database. This relieves the party offering the support services from the substantial burden of having to maintain the database.

The fact that, in event of a fault with the computer, a parameter can be transmitted from the computer, automatically decoded and the used as key to retrieve fuller information regarding the computer concerned from a centrally maintained database greatly facilitates the overall support process. With the above described arrangement, this can be achieved even if the main processing functionality of the computer is not operational.

BRIEF DESCRIPTION OF THE DRAWINGS

A computer system and support arrangement embodying the invention will now be described, by way of non-limiting example, with reference to the accompanying diagrammatic drawings, in which.

BEST MODE OF CARRYING OUT THE INVENTION

Figure 1:
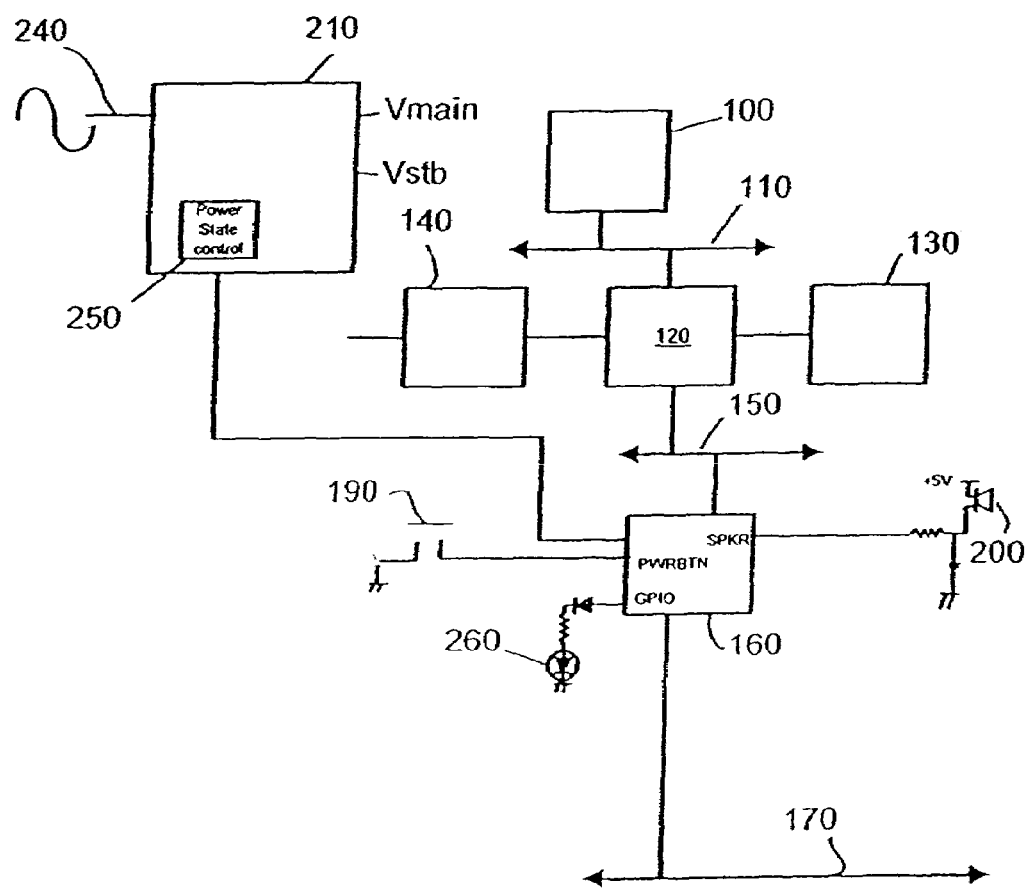
FIG. 1 shows a known type of personal computer system.

FIG. 1 is a schematic diagram showing, in relevant part, the architecture of a personal computer. A microprocessor 100 is connected via host bus 110 to a so-called 'North Bridge' chipset device 120. Chipset device 120 has interfaces to a DRAM memory device 130, a graphics subsystem 140 and a PCI bus 150. Connected to PCI bus 150 is a so-called 'South Bridge' chipset component 160, that provides an interface between PCI bus 150 and ISA bus 170 as well as other functionality. Various of the components including DRAM 130, chipset component 160 and a number of sensors (not shown) are interconnected by a separate two wire bus(not shown), known as the System Management bus (SMBus). The function of the SMBus is to allow system components such as cooling fans to be centrally controlled, and to provide a feedback channel for information on the physical conditions within the PC, such as temperature, to be passed back to the chipset. The chipset can then take appropriate corrective or management action, under the control of suitable application programs.

Two inputs to chipset 160 that are of particular relevance to the present invention are also shown in FIG. 1.

Chipset 160 has an input PWRBTN which is intended for connection to an external power button. Actuation of the user-operable front panel switch simply provides a logical signal to this input of chipset 160 and actual management of the PSU switching is carried out under program control.

Chipset 160 has an output SPKR which provides a signal via a low pass filter to a small internal loudspeaker or buzzer 200. Conventionally, one terminal of the buzzer is connected to the +5V power supply rail. As a consequence, the buzzer will not operate when the +5V rail is not supplied with power.

A further feature of the conventional personal computer of FIG. 1 is that certain components are arranged to be powered by standby power when the computer has been turned off by the user. This permits, for instance, the computer to be switched on via a signal transmitted over a computer network. More particularly, the computer includes a power supply system 210 comprising a main power supply output Vmain and a standby power supply output Vstb both intended to run off an external power source 240. The power supply system includes a power-state controller 250 having at least first, second and third states. The unit resides in its first state when the computer is disconnected from the external power source 240; in this first state, neither Vmain nor Vstb is energised and most circuits of the computer are inactive (in fact, an internal battery is used to maintain certain key circuits). When the external power source 240 is connected, the control unit will reside in either its second or its third state. In the second state of the unit 250, only Vstb is energised. In the third state of the unit, the main supply 220 provides output Vmain that powers all the circuits of the computer. A connection from chipset component 160 allows the state of the power provisioning system to be controlled. In particular, under the control of chipset 160 user-operable front panel switch 190 serves to toggle the power-state control unit 250 between its second and third states as commanded by the user.

A general purpose output from chipset 160 can be used to control a LED 260 that indicates to the user that the computer is on.

The above described components are available from Intel Corporation and other well known suppliers and their general operation, being well understood by those skilled in the art, does not form part of the invention.

Figure 2:
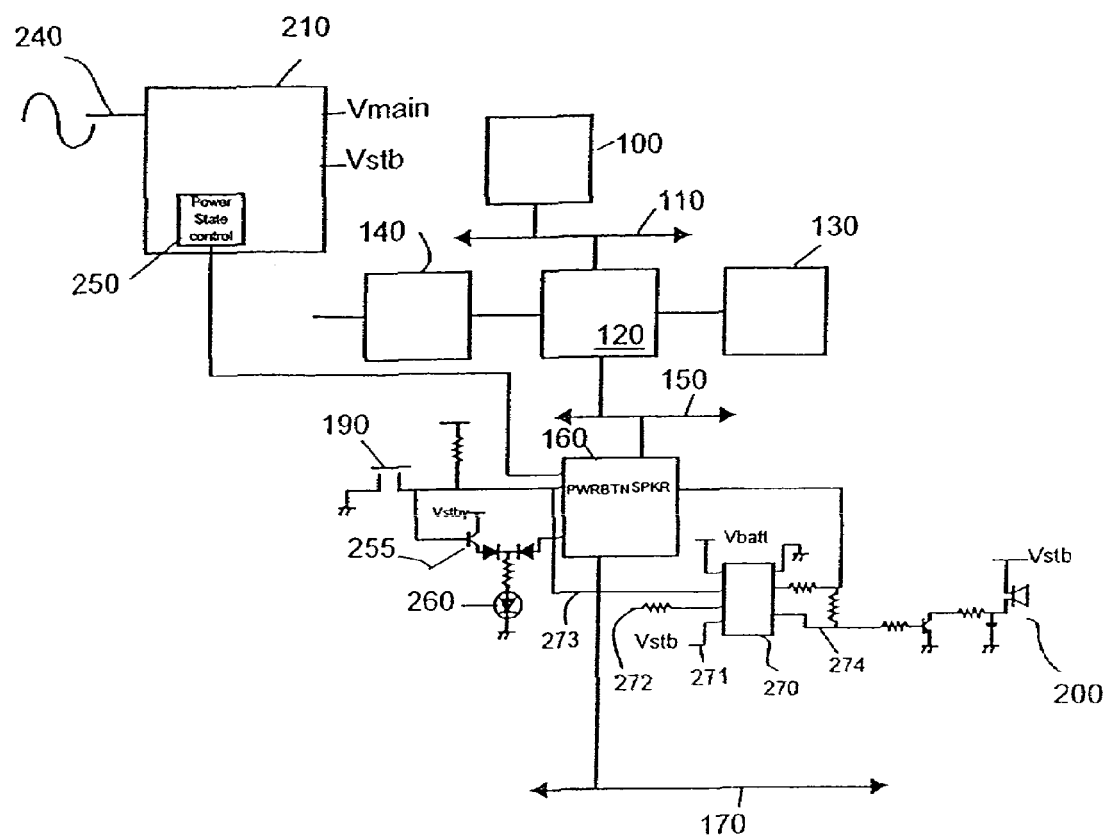
FIG. 2 shows a personal computer system in one embodiment of the invention.

FIG. 2 shows a personal computer with the same general architecture, but with an improved diagnostic interface.

In the computer of FIG. 2, power button 190 is connected to the gate of a transistor 255 which controls the current supplied to an LED 210 from standby power rail Vstb in this way it can be guaranteed that if the user presses switch 190 and LED 260 is on, then (i) the power supply is delivering at least standby power; (ii) the power outlet is delivering AC power to the machine; and (iii) the power switch is mechanically good. This removes one test that always needs to be performed in any diagnostic analysis. The extra cost of adding this circuitry to the PC is very low.

In the computer of FIG. 2, the internal buzzer 200 is connected to the standby power rail Vstb. This enables it to be used as a signalling device as will be described in more detail below, even in the event of failure of the bulk of the components of the computer.

In order to efficiently diagnose a hardware problem without a display device available, the computer of FIG. 2 employs an alternate interface. In conventional personal computers, the BIOS uses the PC buzzer, under the control of chipset component 160, to issue beeps when it finds a "Terminal Error" before the display is available (for example during memory initialisation). However, before the Bios actually has the chance to execute, there are many potential problems that could prevent the PC from successfully booting. Examples include a short circuit on the motherboard or a processor that is not correctly plugged-in.

In order to be able to use the PC buzzer even under these conditions, an independent microcontroller 270 is provided that is powered from the Vbatt line and is used to generate diagnostic signals that drive buzzer 200. The Vbatt line is powered from an internal battery if the computer is not connected to the mains and Vstby otherwise. In-band signalling is encoded within the acoustic signals to enable the computer to transmit information pertaining to an internal state of the computer without requiring a human listener to understand such information directly from the acoustic signals.

This facility can be used when the user has to call a support agent over a helpline in the event of a failure. When a support agent wants to troubleshoot a PC problem, they have to ask some questions to the user. This is often problematic because customers can be nervous or under stress.

For instance, most support calls start by a query on the PC model number or serial number. This information is sometimes difficult for the user to access, as it is often located on stickers that are, for instance, to the rear of the machine or the machine itself may be under a desk. Dictating these numbers over the telephone is also an inconvenient process.

Using the PC buzzer to transmit directly over the telephone at least some of the information that needs to be collected reduces the number of questions needed, and thereby improves the overall efficiency of the support process. The information that could be automatically transmitted could include any of the following—machine serial number, UUID, Processor serial number, diagnostic test results, system configuration, Failing FRU, PC model ID. The information can be automatically transmitted on pre-boot failure, or could be user triggered by pressing for a certain time on the power button from the off state. This latter mode of initiation of the transmission has advantages particularly in the presence of an intermittant fault. In this case, details stored in microcontroller 270 from the last known failure will be transmitted.

The information can either be directly usable by a support agent, for example to query a database to obtain configuration information, lists of known problems etc, or could for example even be used by a computer based telephony system that answers the call to route the call to, for instance, an operator that specialises in the type of machine concerned.

In the present implementation, microcontroller 270 is a simple 12 bit, 8 pin microcontroller available from Microchip Technology Inc, which includes internal ROM program memory and RAM data memory. The diagnostic data, such as the PC serial number, and configuration is written into the data memory at first startup. Microcontroller 270 is programmed to generate coded signals to transmit this data over a telephone line at the request of a user or in the event of a pre-boot failure. A simple FSK modulation is used to encode the information into the audio signals generated.

In the present implementation, rough square waves at frequencies of 1500 Hz and 1300 Hz are generated to encode binary data. The choice of these frequencies has the advantage that the first harmonics 3000 Hz and 2600 Hz (which are present because the square waves are not clean) are still within the pass band of the telephone line so if the signal to noise ratio of the signals on the telephone line does not allow the signal to be decoded at 1300/1500 Hz, the decoder can try to decode the signal at 2600/3000 Hz where the signal-to noise ratio may be better.

An internal clock within microcontroller 270 is used to generate the frequencies. Even though this clock is only accurate to 3%, the difference between two frequencies is determined with greater precision and it has been found unnecessary to use an external clock generator.

A simple embedded synchronisation pattern—a series of a predetermined number of binary 1's—is used to enable the beginning of the coded data to be identified within a recorded signal. Implementation of such a unidirectional transmission scheme using FSK signalling, including suitable decoding techniques, would be well within the skill of those skilled in the art and so further detail will not be given here.

During the BIOS POST, the BIOS initialises external components, such as the memory, video card, PCI cards etc. Any of these components may be defective. In some cases, the BIOS will be able to detect the fault and notify the user with error messages or beep codes. However, if one of these components is faulty, the BIOS will in most cases hang during the initialisation and will not have the opportunity to warn the user. Microcontroller 270 can assist in diagnosing these problems since it does not need any of the PC resources to operate.

To achieve this, microcontroller 270 is connected to buzzer output SPKR so that it can communicate with the BIOS using a simple unidirectional communication protocol. To avoid the communication between the BIOS and microcontroller 270 being audible to the user, microcontroller gates the signals passing from buzzer outpost SPKR to buzzer 200 using signals on line 274.

The communication protocol between the BIOS and microcontroller 270 has 5 basic commands:

SET TATTOO FLAG: This sets a flag in microcontroller 270 that indicates whether or not a diagnostic program has been used at least once on the PC;

READ TATTOO FLAG: This enables the flag to be read by causing microcontroller 270 to generate a certain audible signal;

GET/RELEASE BUZZER: set the signal on line 274 to enable and disable the buzzer. This command is used to disable the buzzer when the BIOS is talking to Microcontroller 270 and to enable buzzer after it has finished doing so;

SERIAL NUMBER/PC ID TRANSMIT: Passes the computer serial number and ID to Microcontroller 270 for storage in its internal RAM. Since the BIOS has no way of reading the RAM of the microcontroller to check whether the correct serial number is stored, the present system is programmed so that the BIOS transmits the serial number at each execution.

CRITICAL SECTION ENTER: tells microcontroller 270 that the BIOS is entering a critical section corresponding to a particular FRU number and gives a time out value.

CRITICAL SECTION EXIT: tells microcontroller 270 that a critical section has been successfully completed.

Figure 3:
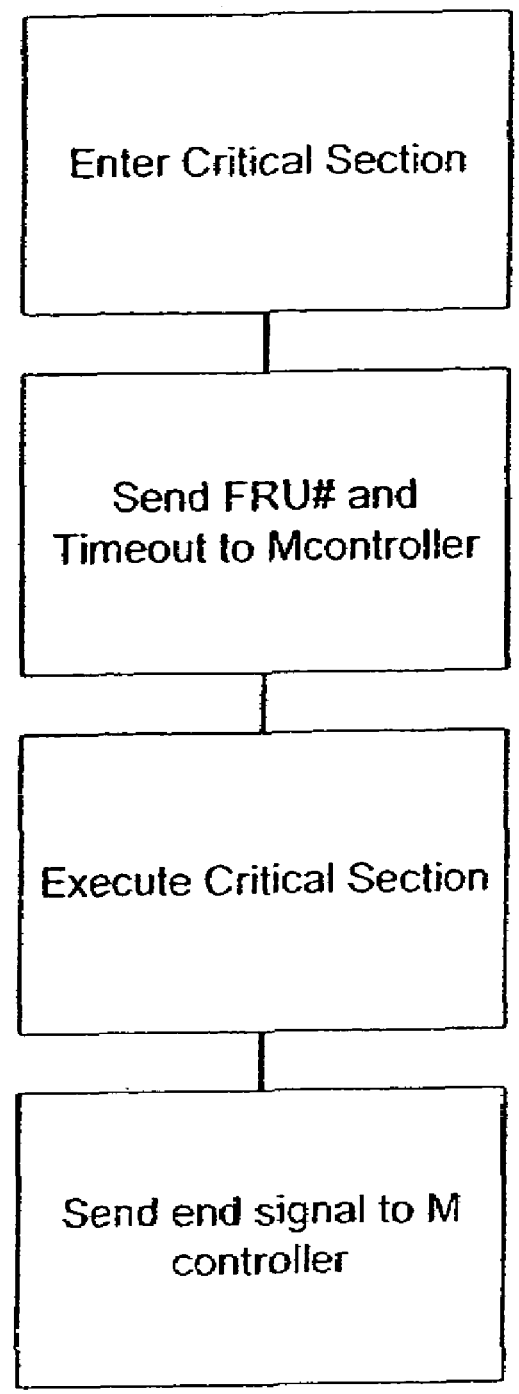
FIG. 3 is a flow chart showing the operation of BIOS.
Figure 4:
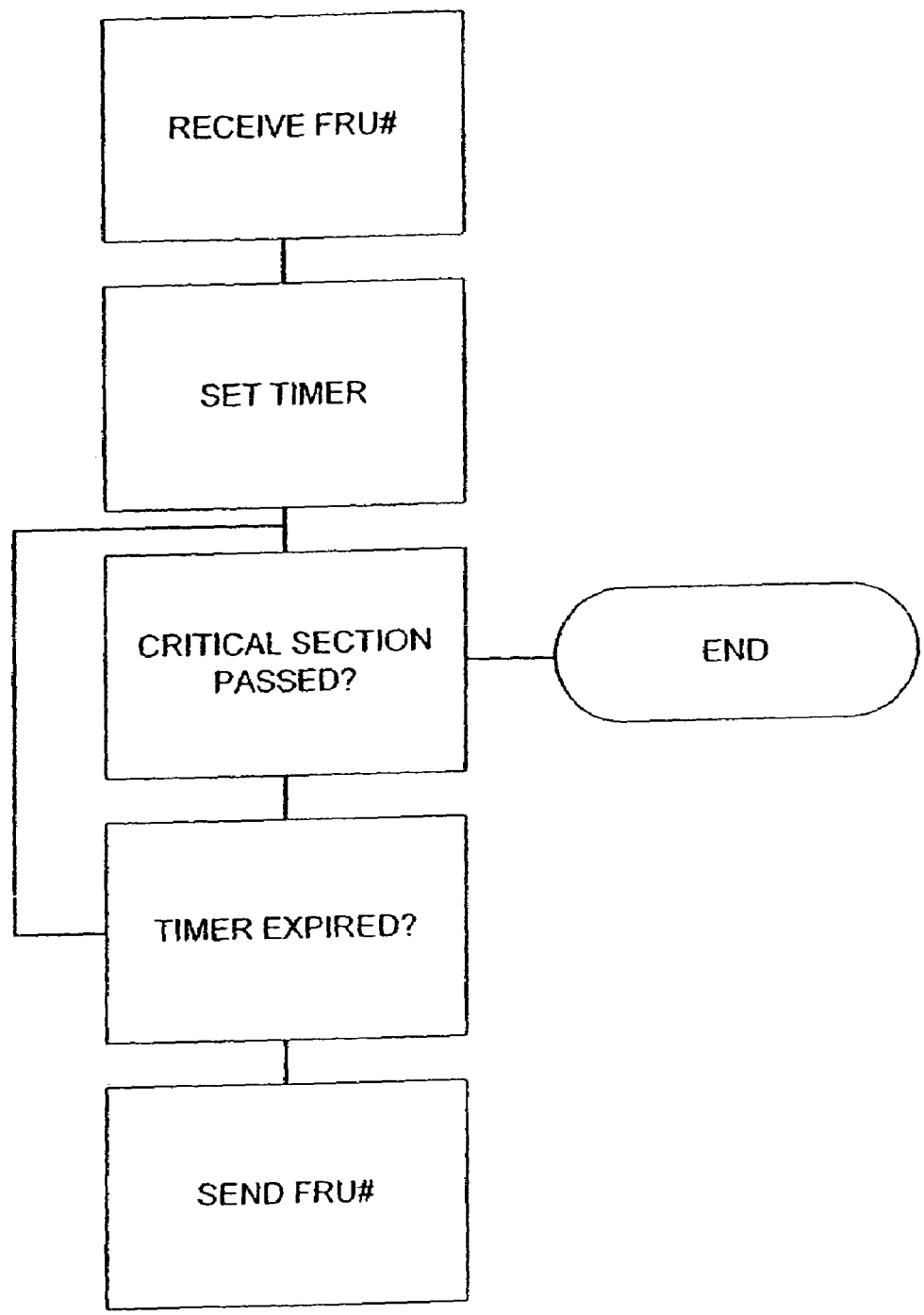
FIG. 4 is a flow chart showing the operation of a microcontroller in the computer system of FIG. 2.

Before the BIOS starts to initialise each of the critical resources that may hang the system—such as system memory, PCI cards or the graphics subsystem—it informs microcontroller 270 via signals transmitted through a suitable simple unidirectional communication protocol—the CRITICAL SECTION ENTER command described above—via the output SPKR that it will be entering a critical section testing a critical resource corresponding to a certain FRU number and that this initialisation should be completed within a certain time. Upon exit of the initialisation, the BIOS will tell microcontroller 270 to cancel the monitoring using the CRITICAL SECTION EXIT command described above. FIG. 3 shows the process that is carried out by the BIOS. The process carried out by microcontroller 270 is shown in FIG. 4. If microcontroller 270 does not receive this EXIT instruction and the timer expires, microcontroller 270 is arranged to transmit the FRU number, together with the system serial number and PC ID, as coded signals through buzzer 200. This technique can be used to diagnose failures during the boot process.

The conventional "terminal error" signal generated by the BIOS are replaced by signals generated by microcontroller 270.

In alternative embodiments, microcontroller 270 could be connected to the system management bus (SMBus) and the BIOS could talk to it using the SMBus, although the need to include an interface to the SMBus could add significantly to the cost of the arrangement.

Within current Intel-based personal computer architectures, the advantage of communicating with a subsystem, such as microcontroller 270 using the output SPKR is that although special programming is required in the BIOS to enable this, such programming need only be carried out once. The output SPKR is a so called 'legacy' feature the programming interface to which does not change with successive generations of chipset products and whose correct operation is required in order to allow forward compatibility of the programs that run on the computer. In consequence, this BIOS code that enables communication with microcontroller 270 via output SPKR will not normally need to be updated for new generations of chipset products 160.

In the present implementation, the product serial number, computer ID and the failing FRU number are transmitted encoded using FSK coding within a sound signal generated in microcontroller 270. In addition, the failing FRU number is also transmitted as a series of beeps—the number of beeps sequentially transmitted corresponding to the number of the failing FRU. In this way, the failing FRU number can be recognised by the user so that the diagnostic information is understandable even if a decoder for the sound stream is unavailable. In this event, the serial number and computer ID are normally available to the user via a sticker on the computer so it does not present support being provided if this data is not unidestandable from the sound stream.

If the boot fails with a blank screen then the user can be asked to reproduce the problem and the signals are generated automatically by microcontroller 270. If the failure has not occurred during the boot and some components of the system are working then the signals can be generated at the request of a suitable application program, by the use of a keyboard shortcut key, by use of the power button as described below or other suitable method.

Further features of microcontroller 270 are also shown on FIG. 2.

At pin 271, microcontroller 270 detects the presence of Vstby. If Vstby is not present, then this means that the computer is not connected to mains power 240. If this is the case, then microcontroller 270 is arranged to restrict its operation to merely maintaining the contents of its internal RAM in order not to drain the power stored in the internal battery. Generally personal computers are configured so that, if Vstby is present, then the internal battery is either being recharged or the power available on the Vbatt line is in fact being provided by Vstby.

In addition, pin 272 is connected to one of the pins of processor 100 and acts to detect in a simple manner whether processor 100 is correctly plugged in.

A direct connection 273 is also provided from microcontroller 270 to power button 190 in order to allow microcontroller 270 to detect the state of power button 190. This, in conjunction with a software timer within microcontroller 270, allows the emission of the transmission to be initiated by holding down the power button for a certain time—5 seconds for instance.

Figure 5:
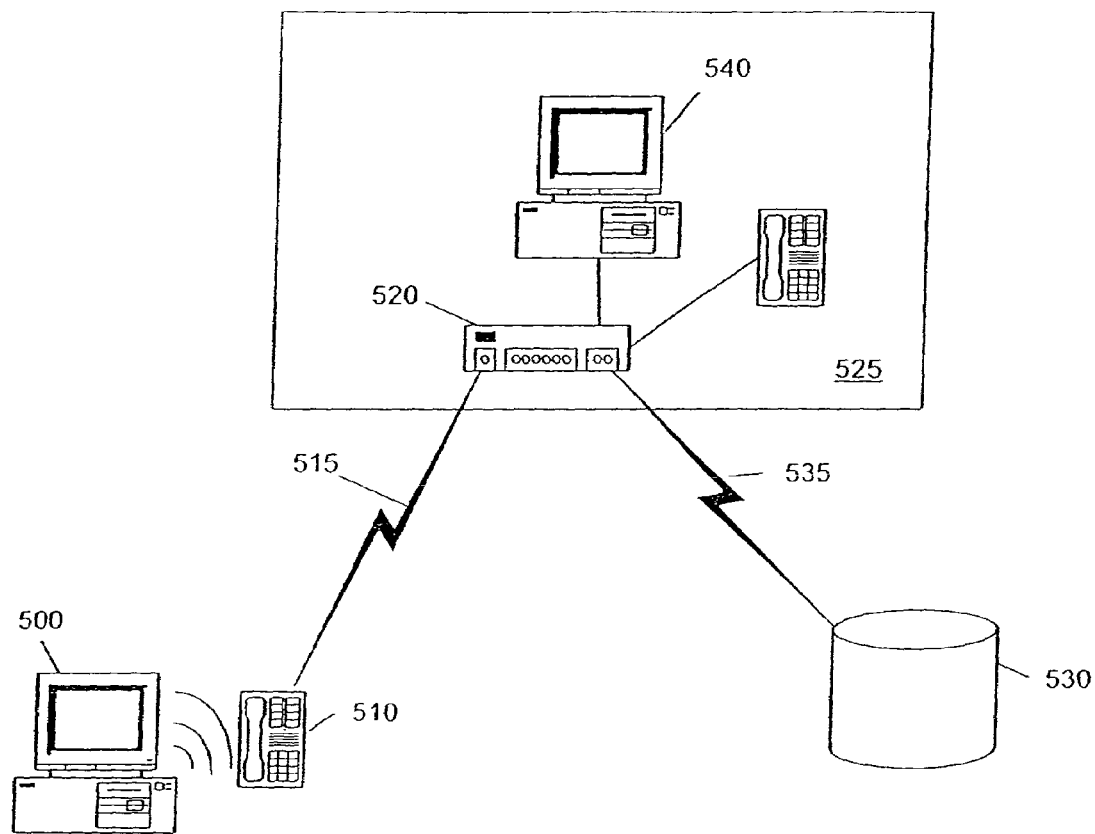
FIG. 5 is a schematic diagram showing an arrangement for providing remote support services to a user of the computer system of FIG. 2.

FIG. 5 is a schematic diagram showing an arrangement for providing remote support services to a user of the above described computer, indicated in FIG. 5 at 500.

The basic arrangement is as follows. When computer 500 breaks down or fails to boot, its user calls a help line number using a conventional telephone 510. The call, passing over telephone network 515 is answered in a call handling center, indicated generally at 525. It will, of course, be understood that many different arrangements are possible for call handing center 525 and that the infrastructure may be highly complex and the human operators may be geographically dispersed, FIG. 5 is therefore very schematic in this respect.

At some point after the call is answered, the user holds the telephone handset close to computer 500 so that the sounds made by the computer are picked up and communicated to call center 525. A decoder, illustrated at 520, automatically decodes the sound information to retrieve the serial number of the PC concerned. Once decoded this information can be used in many ways.

For instance in one scenario, the decoder 520 automatically generates a database query from the parameter for retrieving for presentation to a support agent diagnostic data, such as a trouble shooting tree and other relevant information such as warranty status or the like, for the particular computer concerned.

The database query is transmitted over the internet—represented at 525—to a web server linked to a database 530 maintained separately from the call handling system. The results of the query are displayed to a human operator via a web-browser on their workstation 540. The operator is then able to use this information to progress the call directly with the user.

Although a specific embodiment of the invention has been described, the invention is not to be limited to the specific arrangement so described. The invention is limited only by the claims. The claims themselves are intended to indicate the periphery of the claimed invention and are intended to be interpreted as broadly as the language itself allows, rather than being interpreted as claiming only the exemplary embodiment disclosed by the specification.

What is claimed is:

1. Electronic apparatus comprising main operative functionality and a power provisioning system for powering the apparatus from an external power source, the power provisioning system comprising:
   a main power supply output for energizing the main operative functionality of the apparatus when said power provisioning system is connected to said external power source, and
   a standby power source for energizing only a subset of the components of the apparatus when said apparatus is in a standby state in which the main operative functionality is not operational, the apparatus further comprising a self contained subsystem operable independently of the main operative functionality including a memory for storing at least one parameter reflecting an internal state of the main operative functionality, said self contained subsystem being powered by said standby power source and including an encoder for encoding the parameters in an output signal and a transducer for generating a wireless transmission from the output signal, which transmission can be detected in the vicinity of the apparatus, so as to enable the parameter to be received and decoded.

2. Apparatus as claimed in claim 1 wherein the parameter is encoded within the transmission in a form that does not allow a human to understand the parameter directly from the transmission.

3. Apparatus as claimed in claim 1 wherein the parameter comprises a serial number of the apparatus.

4. Apparatus as claimed in claim 1 wherein the parameter that is transmitted in a form that cannot be understood by a human is recorded on a surface of the apparatus.

5. Apparatus as claimed in claim 1 wherein the memory stores at least two parameters and the encoder is arranged to encode in the transmission at least one parameter in a form that is understandable to a human.

6. Apparatus as claimed in claim 5 wherein the parameter that is understandable to a human is a code enabling a failing unit of the apparatus to be identified.

7. Apparatus as claimed in claim 1 wherein the transmission is a sound including in-band encoded signals.

8. Apparatus as claimed in claim 7 wherein the transducer is a speaker or buzzer whose primary purpose is to issue sounds generated within a core-logic chipset.

9. Apparatus as claimed in claim 7 wherein the parameter is encoded in the sounds using frequency shift keying.

10. Apparatus as claimed in claim 7 wherein the sounds include an embedded synchronization pattern.

11. Apparatus as claimed in claim 1 in the form of a personal computer, the main operative functionality including a processor and data storage means interconnected by a bus system.

12. A personal computer comprising main operative functionality and a power provisioning system for powering the apparatus from an external power source, the main operative functionality including a processor and data storage means interconnected by a bus system, the power provisioning system comprising:
   a main power supply output for energizing the main operative functionality of the apparatus when said power provisioning system is connected to said external power source, and
   a standby power source for energizing only a subset of the components of the apparatus when said apparatus is in a standby state in which at least the processor is not operational,
   the apparatus further comprising a sell contained subsystem operable independently of at least the processor and including a memory for storing at least one parameter reflecting an internal state of the main operative functionality, said self contained subsystem being powered by said standby power source and including an encoder for encoding the parameters in an output signal and a transducer for generating from the output signal a sound including in-band encoded signals that do not allow a human to understand the parameter directly from the sound, which sound can be detected in the vicinity of the apparatus, so as to enable the parameter to be received and decoded.

13. Apparatus as claimed in claim 12 wherein the parameter comprises a serial number of the apparatus.

14. Apparatus as claimed in claim 12 wherein the transducer is a speaker or buzzer whose primary purpose is to issue sounds generated within a core-logic chipset.

15. Apparatus as claimed in claim 12 wherein the parameter is encoded in the sounds using frequency shift keying.

16. Apparatus as claimed in claim 12 wherein the sounds include an embedded synchronization pattern.

17. Apparatus as claimed in claim 12 wherein the self contained subsystem is connected to a power button and includes a timer arranged to time actuation of the power button, the self contained subsystem being responsive to actuation of the power button for a certain time to initiate the transmission.

* * * * *